US005923831A

United States Patent [19]
Palmer et al.

[11] Patent Number: 5,923,831
[45] Date of Patent: Jul. 13, 1999

[54] METHOD FOR COORDINATING MEMBERSHIP WITH ASYMMETRIC SAFETY IN A DISTRIBUTED SYSTEM

[75] Inventors: John Davis Palmer; Hovey Raymond Strong, Jr., both of San Jose, Calif.; Eliezer Upfal, Providence, R.I.

[73] Assignee: International Business Machines Corporation, Armonk, N.Y.

[21] Appl. No.: 08/924,811

[22] Filed: Sep. 5, 1997

[51] Int. Cl.[6] .................................................. G06F 11/00
[52] U.S. Cl. ........................................................ 395/182.1
[58] Field of Search ............................ 395/182.1, 182.11, 395/182.02, 185.1, 200.11

[56] References Cited

U.S. PATENT DOCUMENTS

| | | | |
|---|---|---|---|
| 4,342,084 | 7/1982 | Sager et al. | 364/200 |
| 5,146,605 | 9/1992 | Beukema et al. | 395/575 |
| 5,423,044 | 6/1995 | Sutton et al. | 395/725 |
| 5,513,354 | 4/1996 | Dwork et al. | 395/650 |
| 5,544,345 | 8/1996 | Carpenter et al. | 395/477 |
| 5,550,973 | 8/1996 | Forman et al. | 395/182.03 |
| 5,758,052 | 5/1998 | Glowny et al. | 395/182.02 |
| 5,784,550 | 7/1998 | Brockmann et al. | 395/183.09 |
| 5,802,265 | 9/1998 | Bressoud et al. | 395/182.09 |
| 5,835,697 | 11/1998 | Watabe et al. | 395/182.09 |

OTHER PUBLICATIONS

S. Chaudhuri, "More Choices Allow More Faults: Set Consensus Problems in Totally Asynchronous Systems." Information and Computation 105, 132–158 (1993).

D. Malki, "Uniform Actions in Asynchronous Distributed Systems," Journal of the Association for Computing Machinery, 0–89791–654–9/94/0008.

D. Dolev et al., "On the Minimal Synchronism Needed for Distributed Consensus," Journal of the Association for Computing Machinery, vol. 34, No. 1, Jan. 1987, pp. 77–97.

M. Herlihy et al., "Set Consensus Using Arbitrary Objects," ACM 0–89791–654–9/94/0008.

S. Chaudhuri et al., "Understanding the Set Consensus Partial Order Using the Borowsky–Gafni Simulation," Proceedings of the 10th International Workshop on Distributed Alogrithims, Italy, 1996.

M. Aguilera et al., "Randomization and Failure Detection: A Hybrid Approach to Solve Consensus," Proceeding of the 10th International Workshop on Distributed Algorithms. Italy, 1996.

G. Bracha et al., "Asynchronous Consensus and Broadcast Protocols," Journal of the Association for Computing Machinery, vol. 32, No. 4, Oct. 1985, pp. 824–840.

Butler W. Lampson, "How to Build a Highly Available System Using Consensus," 10th Annual Workshop–Distributed Algorithms, Italy, 1996.

M. Rosu, "Early–Stopping Terminating Reliable Broadcast Protocol for General–Omission Failure," Proceedings of the 15th ACM Symposium on Principles of Distributed Computing, 1996.

(List continued on next page.)

*Primary Examiner*—Hassan Kizou
*Assistant Examiner*—Omar A. Omar
*Attorney, Agent, or Firm*—Khanh Q. Tran

[57] ABSTRACT

A method is disclosed for coordinating membership subject to an asymmetric safety condition from multiple processes in a distributed system. Each is callable by a distributed application for system status or for executing tasks of the application. Initially, each process sends the other processes its view on their status, where the view includes the names of a group of the processes. It then waits for similar views from other processors except those regarded as failed in its own view, up to a predetermined timeout. Each process then generates a resulting view by intersecting its local view with the names of those processes from which it has received views. The local views are updated based on the resulting views and again exchanged until a termination condition occurs.

54 Claims, 4 Drawing Sheets

OTHER PUBLICATIONS

T. Chandra, "Polylog Randomized Wait–Free Consensus," Proceedings of the 15th ACM Symposium on Principles of Distributed Computing, 1996.

I. Keider et al., "Efficient Message Ordering in Dynamic Networks," Proceedings of the 15th Annual ACM Symposium on Principles of Distributed Computing, 1996.

T. Chandra et al., On the Impossibility of Group Membership, Proceedings of the 15th Annual ACM Symposium on Principles of Distributed Computing, May 1996.

G. Neiger, "A New Look at Membership Services," Proceedings of the 15th Annual ACM Symposium on Principles of Distributed Computing, 1996.

C. Dwork et al., "Collective Consistency," Proceedings of the 10th International Workshop on Distributed Algorithms, Italy, 1996.

T. Chandra et al., "Unreliable Failure Detectors for Asynchronous Systems," Proceedings of the 10th Annual ACM Symposium on Principles of Distributed Computing, 1991.

M. Ficsher et al., "Impossibility of Distributed Consensus with One Faulty Process," Journal of ACM 32(2), 1985.

D. Peleg et al., "Crumbling Walls: A Class of Practical and Efficient Quorum Systems," Proceedings of the 14th ACM Symposium on Principles of Distributed Computing, 1995.

T. Chandra et al., "The Weakest Failure Detector for Solving Consensus," Proceedings of the 11th ACM Symposium on Principles of Distributed Computing, 1992.

R. Anderson et al., "Wait–Free Parallel Algorithms for the Union–Find Problems," Proceedings of the 23rd ACM STOC, 1991.

METHOD FOR COORDINATING MEMBERSHIP WITH ASYMMETRIC SAFETY IN A DISTRIBUTED SYSTEM

CROSS REFERENCE TO RELATED APPLICATIONS

This application contains materials related to a application for "Method and System For Achieving Collective Consistency In Detecting Failures In A Distributed Computing System," by Dwork et al., Ser. No. 08/522,651, filed Sep. 1, 1995, now U.S. Pat. No. 5,682,470, which is commonly assigned with this application and incorporated by reference herein.

FIELD OF THE INVENTION

The present invention relates generally to distributed data processing. More particularly, the invention relates to methods for estimating current membership of a group of cooperating processes in a distributed computing system, in view of failures and tardiness.

BACKGROUND OF THE INVENTION

Distributed computing systems, especially those having parallel architectures, employ a plurality of processing elements that operate logically concurrently to perform a single task. The processing elements might be individual processors linked together in a network or a plurality of software instances operating concurrently in a coordinated environment. In a network configuration, the processors communicate with each other through a network which supports a network protocol. This protocol might be implemented using a combination of hardware and software components. In a coordinated software environment, the software instances are logically connected together through some communication medium such as an Ethernet network. The software instances are referred to, individually as members, and together as a group.

The processing elements typically communicate with each other by sending and receiving messages or packets through a common interface. A processing element typically makes a collective call at the common interface which is coordinated among a subset of the processing elements. The elements involved in the call are referred to as participants. In many applications, frequently used collective calls are provided in a common communication library such as the industry standard Message Passing Interface. Further details on this standard are described in "*MPI: A Message-Passage Interface Standard*," published by the University of Tennessee, 1994, (hereinafter, MPI). The communication library provides not only ease in parallel programming, debugging, and portability but also efficiency in the communication processes of the application programs.

One of the problems associated with a distributed system is that it is not possible to guarantee a consistency in failure detection by the processing elements so that each correctly functioning member is guaranteed an accurate and consistent view of the current membership. Thus, failure or tardiness of some processing elements may not be consistently detected and reported by the other elements. Inconsistency in these reports makes recovery from system failures difficult. The problem of keeping the views of the members in the membership accurate and consistent is called the membership problem. Members join a group because of events external to the cooperative task assigned to the group. Members leave a group either because of such external events or because of a failure of the member or of computing resources on which the member depends. These external and failure events are called membership events. Ideally, within a short time after any membership event, all remaining members of the group would have the same accurate view of the group. Thus, an ideal membership protocol would have these features: (1) being triggered by some membership event, (2) requires at most a fixed amount of time to complete, (3) results in complete consistency of views of the remaining members, and (4) each remaining member's view consists of exactly the set of remaining members. It is known that no such ideal membership protocol is possible in the presence of crash failures and lost messages.

One strategy for approximating an ideal membership protocol is to assume a high degree of synchrony in the computation and the transport layer of the processing elements. These are referred to as synchronous agreement protocols, such as the one described by Dwork et al. in U.S. Pat. No. 5,513,354. This patent discloses a method for managing tasks in a network of processors in which the processors exchange views as to which processors have failed and update their views based on the views received from the other processors. After a number of synchronous rounds of exchange, the operational processors reach an eventual agreement as to the status of the processors in the system. A failure in the assumed synchrony would lead to either inconsistency or the problem of "blocking".

Another strategy for approximating the ideal membership protocol is to weaken feature (2) above, the termination condition, to require that the protocol must eventually terminate instead of terminating in a fixed amount of time. Such a weaker membership protocol is referred to as an asynchronous agreement or consensus protocol, similar to the one described by T. Chandra et al. in "*The Weakest Failure Detector for Solving Consensus*," Proceedings of the 11th Annual ACM Symposium on Principles of Distributed Computing, 1992, pp. 147–158. A disadvantage of such a consensus protocol is that there is no guarantee on how long the protocol requires to terminate. So, from a practical point of view, there is no guarantee of termination at all. Moreover, in the presence of communication failures (lost messages) that prevent one subgroup of participants from communicating with another subgroup, it is not even possible to guarantee eventual agreement.

The earlier referenced patent application Ser. No. 08/522,651 describes another method that further weakens the membership conditions to neither require termination (feature 2) nor accuracy (feature 4) and, for safety (feature 3) to require only that, if the views of two members differed then neither member was contained in the view of the other. Membership protocols satisfying these much weaker constrains are said to achieve interactive consistency, and referred to as interactive (or collective) consistency protocols. The advantage of interactive consistency protocols is that they usually terminate quickly and achieve both consistency and accuracy in the sense that a members view of the current membership usually consists of the set of members with whom it could communicate. Their disadvantage is that there are no termination guarantees (i.e., they can not use a time-out), so a protocol might block forever waiting for a message that would never be sent from a member that has crashed.

Still another form of weakened membership protocols, referred to as dynamic uniformity, is described by D. Malki et al. in "*Uniform Actions in Asynchronous Distributed Systems*," Proceedings of the 13th Annual ACM Symposium on Principles of Distributed Computing, 1994, pp. 274–283.

Generally, dynamic uniformity requires that each correctly functioning participant either reaches the same decision as reached by any other participant or is eventually viewed as disabled by others. The main disadvantages with dynamic uniformity protocols are their complexity and possible temporary inconsistency.

Therefore, there is still a need for a membership protocol in a distributed system that is simple and without the above disadvantages. The present invention describes such a protocol subject to an asymmetric safety condition: whenever two members have different views as a result of the proposed membership protocol, at least one regards the other as outside the current membership. In other words, at least one of the two members does not appear as a member identified by the other.

SUMMARY OF THE INVENTION

The present invention relates to a method for coordinating membership in a distributed system having multiple cooperating processes, in view of process failures and tardiness.

It is an object of the present invention to provide a method for coordinating membership in a distributed system subject to an asymmetric safety condition, such that whenever two members have different views as a result of the membership method, at least one regards the other as outside the current membership.

It is another object of the present invention to provide a membership method that can achieve a nonblocking termination in a fixed amount of time at the expense of the weaker safety property. If there are only crash failures, then the method reflects accurately the remaining membership within a fixed finite time from the detection of the last crash.

It is a further object of the present invention to provide an efficient method for reorganizing work to be performed by a distributed system among its surviving members, in spite of the fact that their views have only asymmetric safety, in the context of a parallel computation consisting of alternating communication and computation phases, such that after each communication phase, each member knows whether the preceding computation phase was successful and the resulting communication has lead to a check point, or was unsuccessful and must be redone from the preceding checkpoint.

The present invention achieves the foregoing and other objects by providing a computer-implementable method for coordinating membership in a distributed computing system, subject to the asymmetric safety condition. The membership information is returned to multiple processes (or members) responsible for cooperative computing within the distributed system. The method (1) is triggered by the detection of membership events, (2) requires a fixed time to complete, (3) achieves asymmetric safety so that when one execution of the protocol provides different views to two members, then at least one of them has a view that excludes the other from membership, and (4) accurately reflects the new membership when triggered by the leaving or joining of a member with no other membership events or lost messages.

The method is invoked by one or more processes and includes the steps of: (i) exchanging views by the processes where each view represents the status of other processes known to the sending process; (ii) waiting for the views from all other processes except those regarded as failed in the local view of a process or until a specified timeout; and (iii) generating a result view based on the received views and the local view. Optionally, the method returns the result view to the invoking process whenever a termination condition is satisfied. The termination condition is such that either the result view consists of itself as a singleton set, or that the views received by the process and the view it sent are all identical to the received set.

If the termination condition is not satisfied, the process updates its view to a new view that is a subset of the result view. The steps of the method are then iterated from the view exchanging step. In one preferred embodiment of the view updating step, the new view is the result of intersecting the result view with each view sent by a member process whose status is in the result view. In an alternate preferred embodiment of the updating step, the new view is the result of choosing a subset of the result view and intersecting this subset with each view sent by a member of the subset, so that the subset is the lexicographically first subset that maximizes the cardinality of the new view.

In another preferred embodiment of the invention, an application process invokes the membership protocol either when a membership event (a failure or join request) is detected or when a membership protocol message is received from another member process. If a membership event is detected while a membership protocol is in progress, then the application process waits until the completion of the current membership protocol before invoking a new instance of the membership protocol. In an alternate preferred embodiment of the invention, each application process invokes the membership protocol periodically and approximately synchronously. In a third alternate preferred embodiment, each application process invokes the membership protocol at the end of each communication phase that is part of a cooperative (or parallel) computation consisting of synchronous alternating phases of computation and communication.

Additional objects and advantages of the present invention will be set forth in the description which follows, and in part will be obvious from the description and with the accompanying drawing, or may be learned from the practice of this invention.

DESCRIPTION OF THE PREFERRED EMBODIMENTS

The invention will be primarily described in terms of a method for solving the membership problem with asymmetric safety, to be executed by a distributed computing process. However, persons skilled in the art will recognize that a processor, a process controller, or a distributed computing system, which includes suitable programming means for operating in accordance with the method to be disclosed, also falls within the spirit and scope of the invention. In addition, the invention may also be embodied in a computer program product, i.e., a computer-readable medium such as a diskette. Such a product may be intended, manufactured, or sold for use with a suitable data processing system. Programming means for directing the data processing system, with which the product is to be used, to execute the steps of the method of the invention, is written on the recording medium in a form read by the data processing system.

Figure 1:
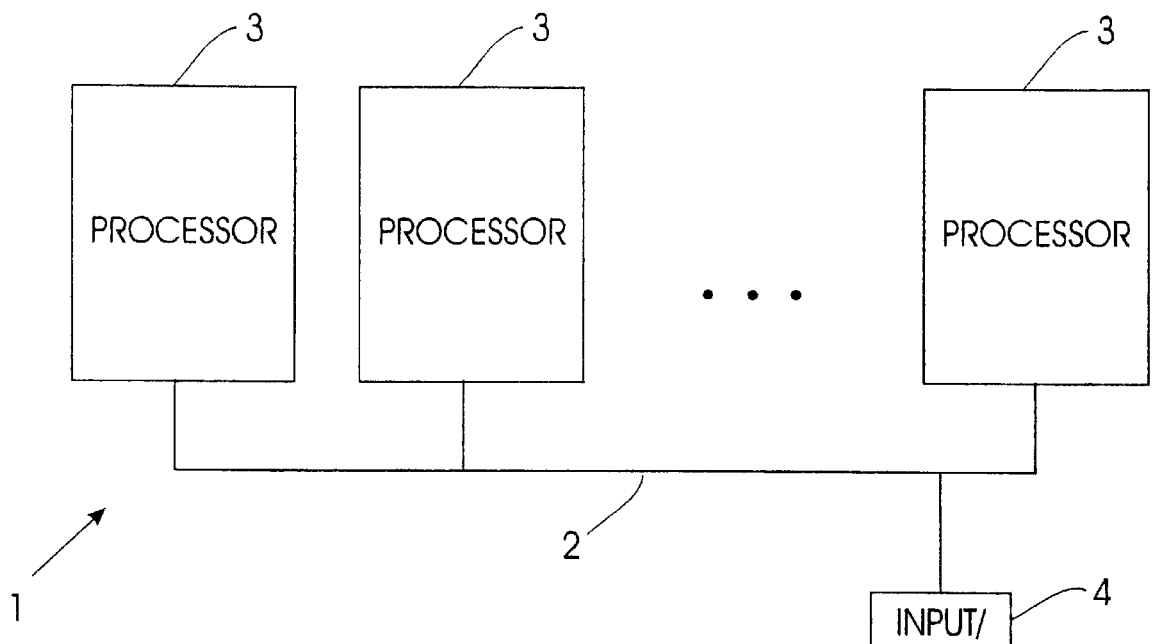
FIG. 1 is a simplified block diagram of a typical distributed computing system that includes a plurality of processors for executing the method of the invention.

FIG. 1 shows a simplified block diagram of a distributed computing system 1 in which the method of the invention may be practiced. The system 1 includes a plurality of processors 3 connected to a communication interface 2. The processors 3 communicate with each other by sending and receiving messages or packets over the communication interface 2. An input/output device 4 schematically represents any suitable apparatus attached to the interface 2 for providing input to the distributed system 1 and receiving output from the system. Alternatively, device 4 may be attached to one of the processors 3. Examples of device 4 are display terminals, printers, and data storage devices.

It will be understood that various configurations of distributed data processing systems known to a person of ordinary skill in the art may be used for practicing the method of the invention. Such systems include broadcast networks, such as token-ring networks, distributed database systems and operating systems which consist of autonomous instances of software. In a distributed computing system, the software instances (also represented as processors 3 in FIG. 1) operate concurrently to perform tasks of the system.

Figure 2:
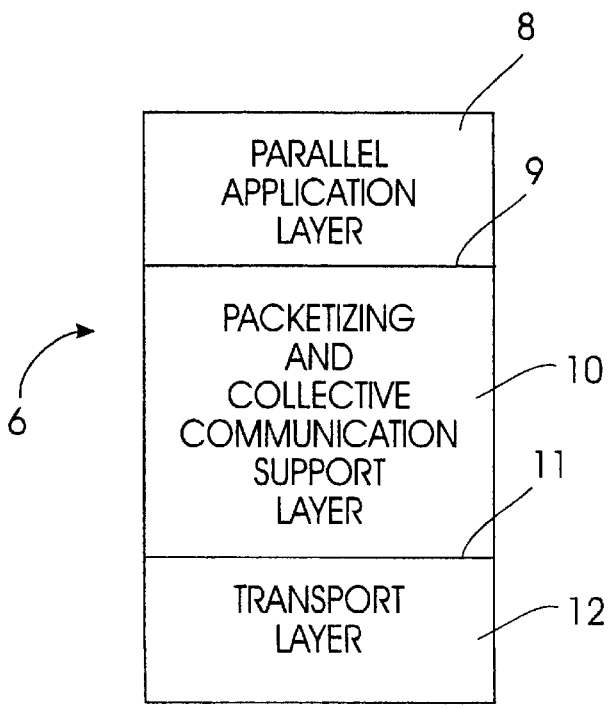
FIG. 2 shows a layer structure of a typical prior art software instance to which the membership protocol of the invention may be applied.

FIG. 2 illustrates the structure of a software instance 6 typical of the ones operating in the distributed computing system 1. Generally, each instance 6 has several software layers: a parallel application layer 8, a packetizing and collective communication support layer 10, and a transport layer 12. The parallel application layer 8 communicates with the packetizing and collective communication support layer 10 by making collective calls at a message interface 9. The message interface 9 is located between layers 8 and 10. An example of the message interface 9 is provided in the industry standard Message Passing Interface (MPI). The packetizing and collective communication support layer 10 communicates with the transport layer 12 by sending and receiving packets through a packet interface 11.

To process an application in the distributed system 1, the application layers 8 of software instances 6 operate in parallel to execute the application. Typically, the software calls at the message interface 9 are coordinated among the instances 6 so that each of the call's participants can determine in advance how much data it is to receive from the other participants. It is also assumed that any one of the instances 6 may suffer a failure at any time. A failure may be a crash or a failure by the instance to meet a certain deadline such as a deadline to receive a packet from another instance. It is also assumed that the communication interface 2 has sufficient connectivity such that, regardless of failures other than those of the interface 2, any two operating software instances 6 can communicate through the communication interface 2.

Figure 3:
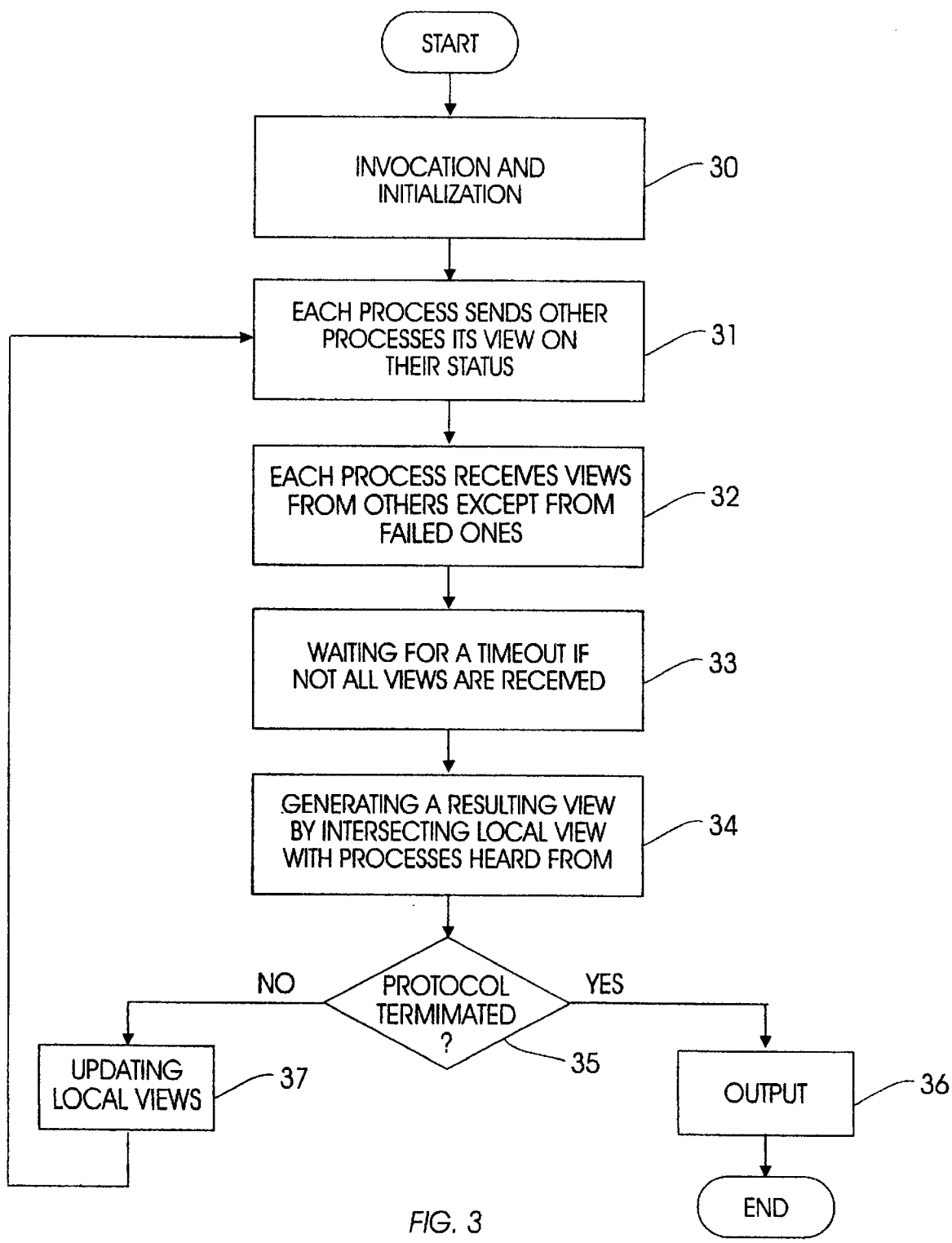
FIG. 3 is a flowchart showing a general operational sequence of the membership protocol with asymmetric safety in accordance with present invention.

FIG. 3 is a high-level flowchart showing the basic operation of the method for coordinating membership subject to an asymmetric safety condition among the processes of a distributed system, in accordance with the invention. The steps shown in FIG. 3 are performed by each member process that has been invoked by a distributed application participating in a membership group. In some distributed systems, the membership method may be invoked synchronously by all participating application processes. Synchronous invocation of the method will be described below in more detail with reference to FIG. 4. In other systems, the method may be invoked either by a membership event (such as a failure detection or a request to join a membership group) or by receipt of a membership message from another process that has invoked the method. These types of invocation are described further below in reference to FIG. 5. Each invoking application process is assumed to have a unique name for its identification. For the purpose of describing the invention, a membership view (or view) will be a set of names of application processes participating in a membership group.

Starting with step 30, the method is first invoked and initialized by one of the processes in the system. In steps 31 and 32, the processes exchange their local views on the status of the processes in the system. During this view exchange, each process sends to the other processes its local view on the status of the others in step 31. In addition, it receives the views from other processes, except from those it regards as failed in its local view, in step 32. The order of steps 31 and 32 is not critical. The round of view exchange is terminated if a timeout occurs and each process has not received all the views from those not regarded as failed in its own view, as shown by step 33. In step 34, each process generates a resulting view by intersecting its local view with the set of names of the processes from which it has received views. (Note that the resulting view is formed very differently than views formed by existing membership protocols). The method then checks whether a termination condition is met in step 35. If so, the resulting view is output in step 36. If the termination condition is not met, the local views are updated and the method steps are reiterated starting from the view exchange steps, as shown by step 37.

In a preferred embodiment of the invention, each process of the membership protocol maintains an array $V(q,r)$ capable of storing any set of names making up a view. The variable q ranges over names and variable r ranges over positive integers up to a maximum larger than the size of any membership group to which the method is applied. Each membership process also maintains two view variables, R and S, a name variable p, counters m and k, and a Receive Buffer. The view variables R and S are used for holding views generated by the process during the operation of the membership protocol. The counters m and k keep track of the number of times the protocol is invoked and the round of view exchanges among the processes, respectively. The Receive Buffer is large enough to store more membership protocol messages than the size of any membership group with which the protocol will deal. The structure of the membership protocol messages will be described in more detail below.

During the invocation and initialization step 30, the above data structure is initialized as follows. The variable p is set to the name of the invoking application process. The counter k is initialized to 1 to indicate the first round of exchange of views. $V(p, 1)$ is set to represent the current view of the membership, which is the original membership or the output of the last completed membership protocol less any members that have since been detected as failed plus any members that have been added because of join protocols. Note that p is included in $V(p, 1)$. The storage for all $V(q,k)$ locations other than $V(p, 1)$ is initialized NULL. The variable m is a counter of the number of instances of membership invocation for the membership group, and is passed as a parameter from the invoking process. Also in the input step 30, any round 1 membership protocol messages for the m-th invocation received before the membership protocol process was invoked are transferred to the Receive Buffer.

In the view exchange stage (steps 31–32), a data structure composed of four parts, V(p,k), p, k, and m, is sent in a membership protocol message to each of the other participants in the protocol. In this message, m indicates the invocation number, k indicates the round number, p indicates the source of the message, and V(p,k) represents the membership view of process p during round k. The membership protocol message may be sent as a point to point message to each participant or it may be sent via a broadcast message in a broadcast communication medium that includes some or all of the participants. After the round k membership protocol message is sent, a timer is started to signal a timeout after a specified time T(k), which may depend on the round number. This timeout time is chosen to be sufficient for most round trip communication between any two processes, including the processing of protocol messages between members unless there are unusual and significant delays. A late round trip communication will be treated like a system failure.

Once the method for coordinating membership is invoked, the invoking process passes all membership protocol messages for invocation m to its Receive Buffer as the messages are received. (Membership protocol messages for the wrong invocation number are discarded.) If a membership protocol message with a data structure <V q,k,m> is found in the Receive Buffer during the view exchange stage, then V(q,k) is set to V. If a membership protocol message with a data structure <V,q,r,m> is found with r not equal to k, then it is discarded. In the preferred embodiments, the view exchange steps 31–32 continue until a timeout is signaled. The membership protocol then enters the result generation phase (step 34).

In step 34, a resulting view R is computed as the intersection of V(p,k) with the set {q|V(q,k) is defined (not NULL)} of the names of the processes from which round k messages have been received (or sent in the case of p). Note that as an optimization, otherwise correct messages from the processes with names not included in V(p,k) may be discarded from the Receive Buffer. Control is then passed to step 35 to determine whether a termination condition for the membership process is satisfied.

In step 35, if either R={p} or for each q in R, [V(q,k)=R], then the method terminates with the output step 36. Otherwise, it continues with the view-updating step 37. In the output step 36, the resulting view R is returned to the invoking application process as the new membership view.

In step 37, each process updates its local view based on the resulting view R and the views received by that process. There are two alternative preferred embodiments for the computation of the updated view S in step 37. In the first alternative, S is set equal to R. In the second alternative, S is chosen so that it is the lexicographically first subset of R to maximize the cardinality of the result of intersecting S with the intersection of the sets {V(q,k)|q in S}. As can be seen, the first alternative is simple. However, the second alternative has a better tolerance for lost messages. Having chosen S in step 37, the view V(p,k+1) is computed as the result of intersecting S with the intersection of the sets {V(q,k)|q in S}. The counter k is then incremented by 1 and the method steps are repeated starting with the view exchange (steps 31–32).

In an alternative preferred embodiment that trades longer time for more tolerance for lost or delayed messages, each round (steps 31 through 34) can be repeated a specified number of times (e.g., 2) before taking the best results on to step 35 (checking for termination of the protocol).

Figure 4:
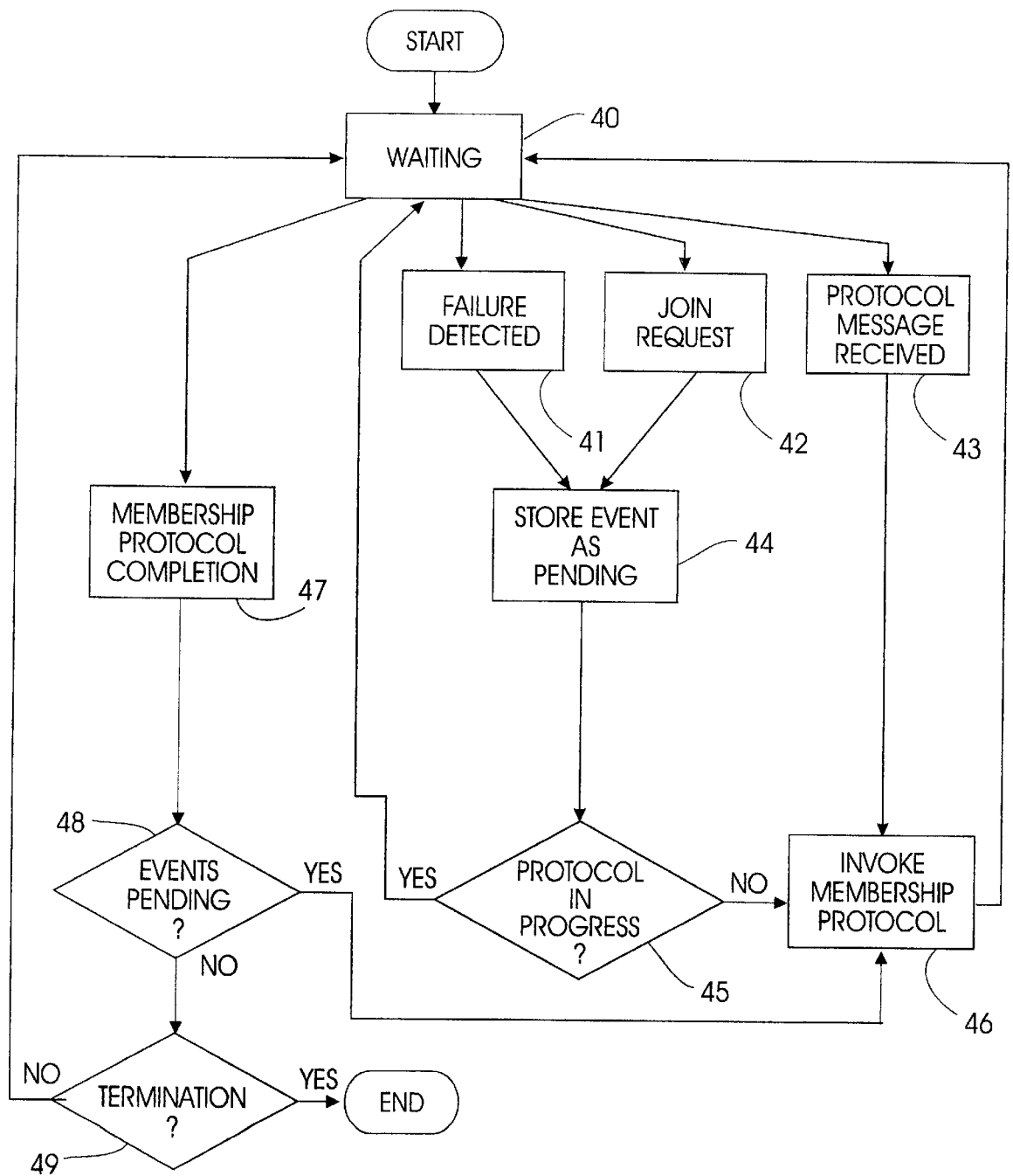
FIG. 4 is a flowchart representing the general operation of a cooperative computing method based on the membership protocol of FIG. 3, in which several processes participate in a group to achieve a cooperative computing goal.

FIG. 4 is a flowchart representing the general operation for a cooperating computing method based on the membership protocol with asymmetric safety described in FIG. 3, in which several application processes participate in a membership group to achieve some cooperative computing goal. FIG. 4 shows the method steps employed by each participating process relative to the invoking of the membership protocol in step 46. The initial step 40, which is labeled "waiting", represents the state of an application process while it pursues its cooperative computing goal and waits (asynchronously) for membership events such as a detected failure (step 41), Join Request (step 42), receipt of a membership protocol message (step 43), and the completion of the membership protocol (step 47).

FIG. 4 reflects the steady state of the cooperative computation. At its beginning, a group of application processes are started with the same initial view of their membership. After the original set of processes has started, each process sets its invocation number (m) to 1 and invokes the membership protocol in step 46. The original group may consist of a single process. A new process may be added by bringing up the process and then sending a Join Request in its name to each member of the current group. Also, each member process typically includes some mechanism for detecting failures in the process. For example, each could periodically broadcast its identity to the others. If some specified number of such messages from one member were missed, then the a Failure Detection event 41 listing the member process whose messages had not arrived would be triggered.

In the case of a Failure Detection 41 event indicating that a process q is missing, control passes to step 44 and an event <Failure Detection of q> is stored in a Pending Membership Event queue.

In the case of a Join Request 42 indicating a process q is to join, control passes to step 44 and an event <Join Request for q> is stored in the Pending Membership Event queue.

After step 44, control passes to step 45 in which a "Membership Protocol In Progress" flag is checked to determine whether a membership protocol is in progress. If no membership protocol is in operation, then the membership protocol is invoked in step 46. Otherwise, control returns immediately to the waiting state (step 40).

In the case of a received protocol message 43 and there is a current membership protocol in progress, then, if the invocation number is equal to that of the current membership protocol, then the message is passed to the Receive Buffer of the membership protocol process and control returns immediately to the waiting step. If the invocation number is not equal to that of the current membership protocol, then the message is discarded and control returns immediately to waiting step 40. If no membership protocol is in progress, then, if the invocation number is less than or equal to the current value of the invocation counter m, the message is discarded and control returns immediately to step 40. Otherwise, the message is passed as an additional parameter during the invocation step 46. In this case, m is set to the invocation counter of the message and passed along with the current membership view V and the new message as parameters to the invoked membership protocol process.

In step 46, if not set from a new message, the invocation counter m is incremented by 1. Each event is removed from the Pending Membership Event queue and processed as follows: If the event is <Failure Detection of q> then q is removed from V; If the event is <Joint Request for q> then q is added to V), the Membership Protocol in Progress flag is set to 'yes', a membership protocol is invoked with parameters m, V, and a new message if any, and control returns to step 40.

When the membership protocol is completed (step 47), control passes to step 48 where entries in the Pending Membership Event queue are removed if they have been accommodated by the completed instance of the membership protocol. If the event is <Failure Detection of q>, it is accommodated if q is no longer in the current membership view. If the event is <Join Request for q>, it is accommodated if q is in the current membership view. If there are entries remaining in the queue that have not been accommodated, then the method continues with another invocation of the membership protocol in step 46.

Figure 5:
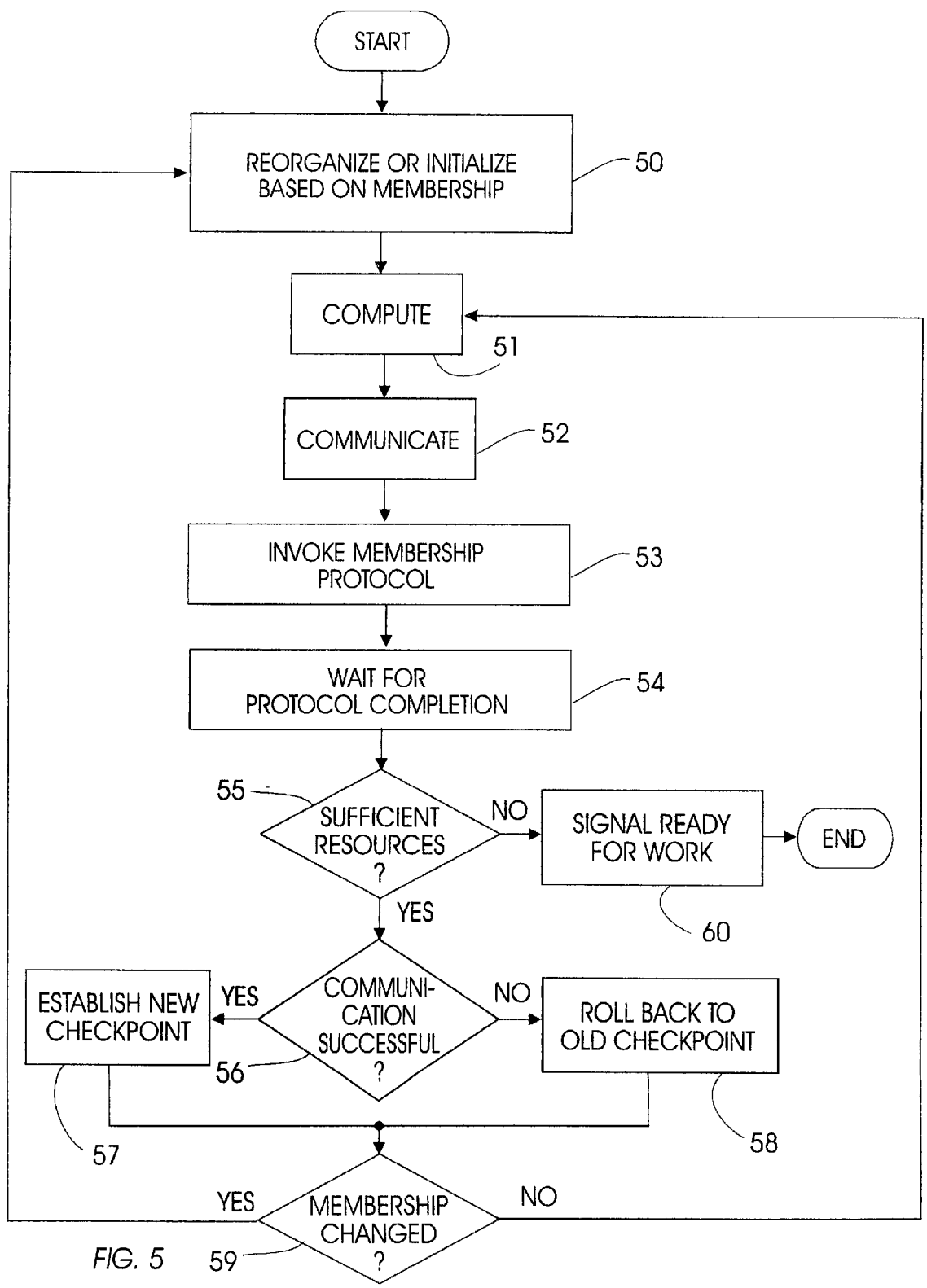
FIG. 5 is a flowchart representing the operation sequence of another use of the membership protocol of the present invention, in which a group of application processes perform a parallel computation.

FIG. 5 is a flowchart representing the operation sequence for another use of the membership protocol of the present invention in which a group of application processes perform a parallel computation. The processes operate in synchronous phases of computation and communication, such that after each successful communication phase, each member computes a new checkpoint from which the entire computation can be continued. In this context, it is further assumed that each application process can decide which work to do in the computation phase from the latest checkpoint and the membership view. This decision is performed in step 50. The method then enters a computation phase 51. When this phase is complete, control passes to a communication phase 52 in which failures may be detected by the parallel processes. If no failures are detected, it is assumed that the communication phase 52 is successful. At the end of the communication phase, the membership protocol is invoked in step 53. The invocation counter m is incremented by 1, the current view V is changed to reflect any detected failures (or any new processes that have requested to join as in FIG. 4), and the membership protocol is invoked with parameters m and V.

Next, the application process waits for the membership protocol to return a new membership view, in step 54. When the membership protocol returns the new view, the results of the membership protocol are checked to test whether there are sufficient resources to continue the parallel computation, as shown by 55. (This can also be the place to check whether the computation is finished.) If there are insufficient resources (or no further computing is required), then control passes to step 60; otherwise control passes to step 56.

In step 60, the current membership is no longer needed for its previous task. Each member (or the leader, selected by lexicographic order from the membership) can indicate its readiness to take on a new task or negotiate to join another membership group with current work. In step 56, if the communication phase was successful, then a new check point is established in step 57. Otherwise, the computation is rolled back to the previous checkpoint in step 58. In either case, from step 57 or step 58, control passes to step 59 where the method determines whether there has been a membership change. If so, the method continues with step 50 in which the computation is reorganized to fit the new membership. Otherwise, it proceeds to the computation step 52. In either case, the parallel computation continues.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method for coordinating membership subject to an asymmetric safety condition in a distributed system, the system having a plurality of processes each identified by a process name, the method being invoked by at least one of the processes and comprising the steps of:

each process sending to the other processes a local view on the status of the other processes, the local view having a group of process names;

receiving, by the process, the views from the other processes except those regarded as failed in the local view;

waiting for a timeout if not all the views from the other processes, except those regarded as failed in the local view, are received; and generating a resulting view by intersecting the local view with a set of names of the processes from which views were received.

2. The method as recited in claim 1 further comprising the step of returning the resulting view to the invoking process when a termination condition is satisfied.

3. The method as recited in claim 2 further comprising the steps, if the termination condition is not satisfied, of updating the local view and repeating the method steps in multiple rounds of view exchange among the processes.

4. The method as recited in claim 3, wherein the updated view is an intersection of the resulting view and received views.

5. The method as recited in claim 3, wherein:

each view corresponds to a cardinality representing the number of processes identified in that view; and the updated view is an intersection of a subset of the resulting view and the views sent by the processes identified in the subset, the subset being a lexicographically first subset of the resulting view that maximizes the cardinality of the updated view.

6. The method as recited in claim 3, wherein the step of generating a resulting view includes intersecting the local view sent in a k-th round with the set of names of the processes from which a view was received during the k-th round to form the k-th resulting view, k being a round identification.

7. The method as recited in claim 3, wherein the step of generating a resulting view includes computing an intersection of the local view sent in a k-th round of exchange and the set of names of the processes from which views were received in the k-th round, k being a round identification.

8. The method as recited in claim 3, wherein the timeout is dependent on a count of the view exchange rounds.

9. The method as recited in claim 2, wherein the termination condition is satisfied when all the views received by the process are identical to both the local view and resulting view of the process.

10. The method as recited in claim 2, wherein the termination condition is satisfied when only the process is identified in the resulting view of the process.

11. The method as recited in claim 1, wherein the views are exchanged by the processes using a point-to-point communication protocol.

12. The method as recited in claim 1, wherein the views are exchanged by the processes using a broadcast protocol.

13. The method as recited in claim 1, wherein the timeout is chosen sufficiently long for a majority of round trip communication between any two processes.

14. The method as recited in claim 1, wherein the processes operate in a membership group to cooperatively perform a joint task.

15. The method as recited in claim 14, wherein the initial local views of the processes in the membership group all identify the same processes in the group.

16. The method as recited in claim 14, wherein a new process may join the membership group by sending a Join Request to each process currently in the group.

17. The method as recited in claim 1, wherein:
each process includes means for detecting failures; and
the method is invoked in response to a detected failure.

18. The method as recited in claim 1, wherein:
the processes operate in synchronous phases of computation and communication to process a parallel application, where each process computes a checkpoint after each successful communication phase; and
the process determines work to be done in the next computation phase based on the just computed checkpoint and the returned view.

19. A distributed computing system having a plurality of processes participating in a membership protocol, each process comprising:
means for sending to the other processes a local view on the status of the other processes, the local view having a group of names that respectively identifying the processes;
means for receiving the views from the other processes except those regarded as failed in the local view;
means for waiting for a timeout if not all the views from the other processes, except those regarded as failed in the local view, are received; and
means for generating a resulting view by intersecting the local view with a set of names of the processes from which views were received.

20. The system as recited in claim 19, wherein each process further comprises means for returning the resulting view to the protocol when a termination condition is satisfied.

21. The system as recited in claim 20, wherein each process further comprises means for updating the local view and performing multiple rounds of view exchange if the termination condition is not satisfied.

22. The system as recited in claim 21, wherein the updated view is an intersection of the resulting view and the received views.

23. The system as recited in claim 21, wherein:
each view corresponds to a cardinality representing the number of processes identified in that view; and
the updated view is an intersection of a subset of the resulting view and the views sent by the processes identified in the subset, the subset being a lexicographically first subset of the resulting view that maximizes the cardinality of the updated view.

24. The system as recited in claim 21, wherein the means for generating a resulting view includes means for intersecting the local view sent in a k-th round with the set of names of the processes from which a view was received during the k-th round to form the k-th resulting view, k being a round identification.

25. The system as recited in claim 21, wherein the means for generating a resulting view includes means for computing an intersection of the local view sent in a k-th round of exchange and the set of names of the processes from which views were received in the k-th round, k being a round identification.

26. The system as recited in claim 21, wherein the timeout is dependent on a count of the view exchange rounds.

27. The system as recited in claim 20, wherein the termination condition is satisfied when all the views received by the process are identical to both the local view and resulting view of the process.

28. The system as recited in claim 20, wherein the termination condition is satisfied when only the process is identified in the resulting view of the process.

29. The system as recited in claim 19, wherein the views are exchanged by the processes using a point-to-point communication protocol.

30. The system as recited in claim 19, wherein the views are exchanged by the processes using a broadcast protocol.

31. The system as recited in claim 19, wherein the timeout is chosen sufficiently long for a majority of round trip communication between any two processes.

32. The system as recited in claim 19, wherein the processes operate in a membership group to cooperatively perform a joint task.

33. The system as recited in claim 32, wherein the initial local views of the processes in the membership group all identify the same processes in the group.

34. The system as recited in claim 32, wherein a new process may join the membership group by sending a Join Request to each process currently in the group.

35. The system as recited in claim 19, wherein:
each process includes means for detecting failures; and
the protocol is invoked in response to a detected failure.

36. The system as recited in claim 19, wherein:
the processes operate in synchronous phases of computation and communication to process a parallel application, where each process computes a checkpoint after each successful communication phase; and
the process determines work to be done in the next computation phase based on the just computed checkpoint and the returned view.

37. A computer program product for coordinating membership subject to an asymmetric safety condition in a distributed computing system, the system having a plurality of processes participating in a membership protocol, the product comprising:
a computer-readable medium;
means, recorded on the computer-readable medium, for instructing each process to perform the steps of:
sending a local view on the process status to the other processes, the local view having a group of names for respectively identifying the processes;
receiving the views from the other processes except those regarded as failed in the local view;
waiting for a timeout if not all the views from the other processes, except those regarded as failed in the local view, are received; and
generating a resulting view by intersecting the local view with a set of names of the processes from which views were received.

38. The computer program product as recited in claim 37 further comprising means, recorded on the computer-readable medium, for instructing each process to return the resulting view to the protocol when a termination condition is satisfied.

39. The computer program product as recited in claim 38 further comprising means, recorded on the computer-readable medium, for instructing each process to update the local view and execute multiple rounds of view exchange if the termination condition is not satisfied.

40. The computer program product as recited in claim 39, wherein the updated view is an intersection of the resulting view and the received views.

41. The computer program product as recited in claim 39, wherein:
- each view corresponds to a cardinality representing the number of processes identified in that view; and
- the updated view is an intersection of a subset of the resulting view and the views sent by the processes identified in the subset, the subset being a lexicographically first subset of the resulting view that maximizes the cardinality of the updated view.

42. The computer program product as recited in claim 39, wherein the step of generating a resulting view includes intersecting the local view sent in a k-th round the set of names of the processes from which a view was received during the k-th round to form the k-th resulting view, k being a round identification.

43. The computer program product as recited in claim 39, wherein the step of generating a resulting view includes computing an intersection of the local view sent in a k-th round of exchange and the set of names of the processes from which views were received in the k-th round, k being a round identification.

44. The computer program product as recited in claim 39, wherein the timeout is dependent on a count of the view exchange rounds.

45. The computer program product as recited in claim 38, wherein the termination condition is satisfied when all the views received by the process are identical to both the local view and resulting view of the process.

46. The computer program product as recited in claim 38, wherein the termination condition is satisfied when only the process is identified in the resulting view of the process.

47. The computer program product as recited in claim 37, wherein the views are exchanged by the processes using a point-to-point communication protocol.

48. The computer program product as recited in claim 37, wherein the views are exchanged by the processes using a broadcast protocol.

49. The computer program product as recited in claim 37, wherein the timeout is chosen sufficiently long for a majority of round trip communication between any two processes.

50. The computer program product as recited in claim 37, wherein the processes operate in a membership group to cooperatively perform a joint task.

51. The computer program product as recited in claim 50, wherein the initial local views of the processes in the membership group all identify the same processes in the group.

52. The computer program product as recited in claim 50, wherein a new process may join the membership group by sending a Join Request to each process currently in the group.

53. The computer program product as recited in claim 37, wherein:
- each process includes means for detecting failures; and
- the method is invoked in response to a detected failure.

54. The computer program product as recited in claim 37, wherein:
- the processes operate in synchronous phases of computation and communication to process a parallel application, where each process computes a checkpoint after each successful communication phase; and
- the process determines work to be done in the next computation phase based on the just computed checkpoint and the returned view.

* * * * *